United States Patent
Dessart et al.

(10) Patent No.: US 12,275,101 B2
(45) Date of Patent: Apr. 15, 2025

(54) SMART SPOOL DETECTION FOR WELDING-TYPE SYSTEMS

(71) Applicant: Illinois Tool Works Inc., Glenview, IL (US)

(72) Inventors: Nicholas James Dessart, Neenah, WI (US); Alan Adam Manthe, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 834 days.

(21) Appl. No.: 16/842,932

(22) Filed: Apr. 8, 2020

(65) Prior Publication Data

US 2021/0316384 A1 Oct. 14, 2021

(51) Int. Cl.
*B23K 9/12* (2006.01)
*B23K 9/095* (2006.01)

(52) U.S. Cl.
CPC ............ *B23K 9/125* (2013.01); *B23K 9/0953* (2013.01); *B23K 9/0956* (2013.01)

(58) Field of Classification Search
CPC .. B65H 3/08–084; B23K 9/10; B23K 10/006; B23K 9/0953; B23K 9/0956; B23K 9/095; B23K 9/125; B23K 9/124; B23K 9/133; B23K 9/1336; B32K 9/1333
USPC .......... 219/137.71, 132, 130.1, 137.2, 69.12; 356/20–21; 250/559.15, 559.19–559.38
See application file for complete search history.

(56) References Cited

U.S. PATENT DOCUMENTS

| | | |
|---|---|---|
| 6,066,833 A | 5/2000 | Rigdon et al. |
| 6,247,664 B1 | 6/2001 | Petersen |
| 6,510,984 B2 | 1/2003 | Blankenship et al. |
| 6,536,660 B2 | 3/2003 | Blankenship et al. |
| 6,583,386 B1 | 6/2003 | Ivkovich |
| 6,708,877 B2 | 3/2004 | Blankenship et al. |
| 7,032,814 B2 | 4/2006 | Blankenship |
| 7,335,854 B2 | 2/2008 | Hutchison |
| 7,996,276 B2 | 8/2011 | Blankenship et al. |

(Continued)

FOREIGN PATENT DOCUMENTS

| | | |
|---|---|---|
| EP | 0803310 | 10/1997 |
| WO | 9834751 | 8/1998 |

OTHER PUBLICATIONS

Europe Patent Office, extended European Search Report, Application No. 21166601.1, dated Oct. 1, 2021, 8 pages.

*Primary Examiner* — Sang Y Paik
*Assistant Examiner* — Bonita Khlok
(74) *Attorney, Agent, or Firm* — McAndrews, Held & Malloy, Ltd.

(57) ABSTRACT

In some examples, smart spool detection systems use one or more first sensors and/or second sensors to detect and/or determine a first parameter (e.g., size) of a spool that retains filler material (e.g., wire) used by welding-type systems. One or more second sensors are used to detect and/or determine a second parameter of the spool. In some examples, the second parameter may be a weight of the spool, a distance to the filler material (e.g., wire) retained on the spool, and/or an angle of a guide arm lever supported by filler material retained on the spool. The smart spool detection system determines a remaining amount of consumable filler material remaining on the spool using the first and second parameters.

8 Claims, 8 Drawing Sheets

(56) References Cited

U.S. PATENT DOCUMENTS

| | | | |
|---|---|---|---|
| 8,658,941 B2* | 2/2014 | Albrecht | B23K 9/0953 |
| | | | 219/137 R |
| 8,686,318 B2* | 4/2014 | Albrecht | B23K 9/1087 |
| | | | 219/130.01 |
| 9,117,154 B2 | 8/2015 | Enyedy | |
| 9,403,234 B2 | 8/2016 | Christopher et al. | |
| 2006/0070987 A1 | 4/2006 | Daniel | |
| 2008/0035727 A1 | 2/2008 | Stanzel et al. | |
| 2009/0173726 A1 | 7/2009 | Davidson et al. | |
| 2011/0246395 A1 | 10/2011 | Dolson et al. | |
| 2013/0112677 A1* | 5/2013 | Christopher | B65H 59/387 |
| | | | 219/137.2 |
| 2016/0221108 A1 | 8/2016 | Hoffa et al. | |
| 2016/0318116 A1 | 11/2016 | Daniel | |
| 2017/0165779 A1* | 6/2017 | Barhorst | B23K 9/1093 |
| 2020/0095087 A1* | 3/2020 | Delevaque | B23K 37/00 |

* cited by examiner

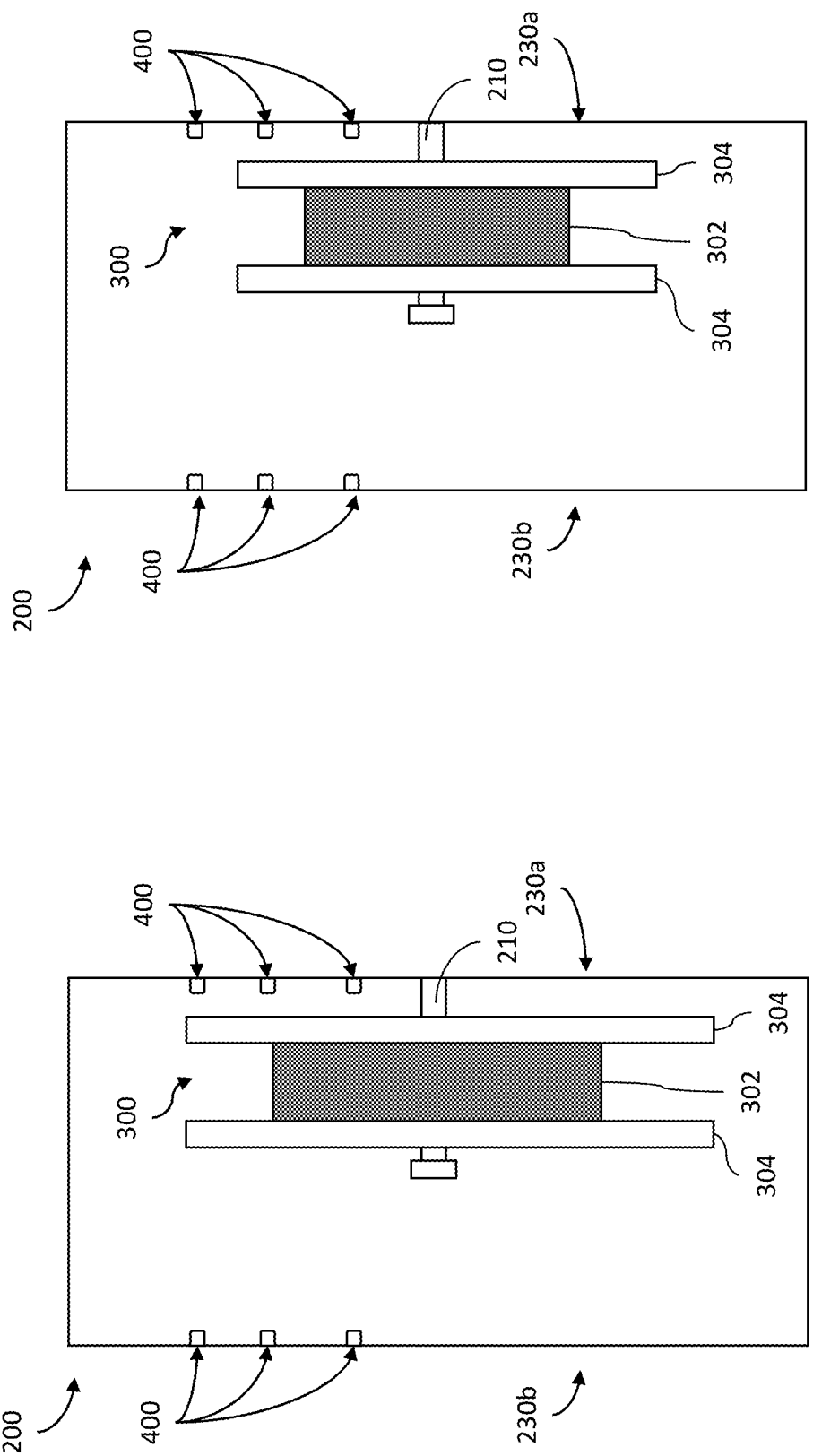

US 12,275,101 B2

SMART SPOOL DETECTION FOR WELDING-TYPE SYSTEMS

TECHNICAL FIELD

This disclosure relates to smart spool detection and, more particularly, to smart spool detection for welding-type systems.

BACKGROUND

Some welding-type systems use consumable filler material, such as electrode wire, to conduct welding-type operations. In some instances, the filler material is stored in a coil on a spool. The filler material may be fed to a welding-type operation from the spool, via a feeder, until the welding-type operation is complete, or the filler material is completely consumed.

SUMMARY

Smart spool detection for welding-type systems are disclosed, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein:

FIGS. 4a-4b are front views of a spool retained within the wire feeder of FIG. 3, with certain components omitted for clarity, in accordance with aspects of this disclosure.

Figure 1:
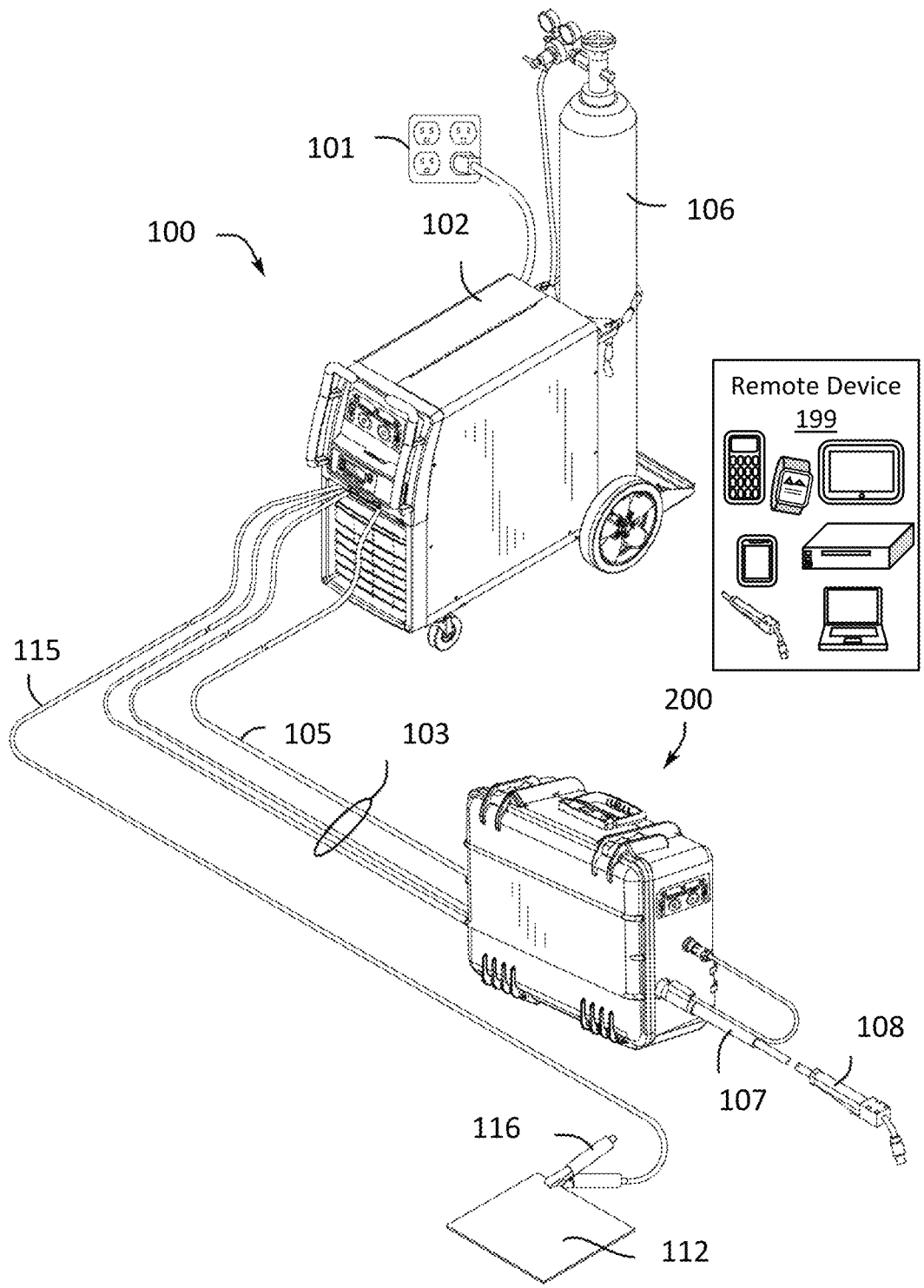
FIG. 1 shows an example of a welding-type system, in accordance with aspects of this disclosure.

The figures are not necessarily to scale. Where appropriate, similar or identical reference numbers are used to refer to similar or identical components. For example, reference numerals utilizing lettering (e.g., sidewall 230a, sidewall 230b) refer to instances of the same reference numeral that does not have the lettering (e.g., sidewalls 230)

DETAILED DESCRIPTION

In conventional wire feeders, an operator typically has to open the wire feeder in order to check how much filler material remains on a spool. In some cases, the operator may also have to remove the spool to perform the check. This can be a nuisance. Additionally, traveling back and forth to/from a feeder to perform the check can result in a loss of productive time. Further, accurately estimating how much time remains before the filler material is consumed can be difficult. However, failure to understand how much filler material remains and/or how long before the filler material is consumed can result in a sudden loss of filler material during a welding process, which can negatively impact the welding process.

Disclosed systems and methods involve a smart spool detection system that can automatically detect and/or determine how much filler material remains on a spool. The system can also detect and/or determine how long until the filler material is consumed. The disclosed smart spool detection system uses one or more first sensors and/or second sensors to detect and/or determine a first parameter of the spool (e.g. size). One or more second sensors are used to detect and/or determine a second parameter of the spool. In some examples, the second parameter may be a weight of the spool, a distance to the filler material retained on the spool, and/or an angle of a guide arm lever supported by the filler material retained on the spool. The smart spool detection system determines a remaining amount of filler material on the spool using the first and second parameters.

The system does not require any special markings or encodings, unlike some other systems. The system also does not rely on a wire feed speed sensor (which can sometimes be inaccurate due to slippage) to determine the remaining amount of filler material. In some examples, the system may automatically order more consumable filler material if needed, or stop the welding operation if the remaining filler material hits a threshold, so as to prevent negative impact on the welding operation.

Some examples of the present disclosure relate to a welding system, comprising: a wire feeder comprising: a spindle configured to retain a wire spool, and a sensor configured to detect a parameter of the wire spool, the parameter comprising a weight of the wire spool, a radius of a wire retained on the wire spool, or a distance from the second sensor to the wire retained on the wire spool. In some examples, the welding system further comprises control circuitry configured to determine a remaining amount of wire on the wire spool based on the parameter, and generate an output based on the remaining amount of wire. In some examples, wherein the output comprises a graphic, video, audio, text, number, or percentage representative of the remaining amount of wire. In some examples, the output is delivered via a first user interface of the wire feeder, a second user interface of a welding-type power supply in communication with the wire feeder, or a third user interface of a remote device in communication with the wire feeder or the welding-type power supply.

In some examples, the output comprises a first output, and the control circuitry is further configured to determine whether the remaining amount of wire is below a threshold, and generate a second output in response to determining the remaining amount of wire is below the threshold, where the second output comprises a link to a website or service where more wire can be ordered, an automatic reordering of wire, or a disabling of the wire feeder or a welding-type power supply. In some examples, the output comprises a first output, and the control circuitry is further configured to determine a remaining amount of time before the remaining amount of wire is below the threshold based on the remaining amount of wire and a wire feed speed of the wire feeder, and generate a second output based on the remaining amount of time.

In some examples, the parameter comprises a second parameter, and the wire feeder further comprises a device configured to detect a first parameter of the wire spool retained on the spindle, the first parameter comprising a size of the wire spool. In some examples, the sensor comprises a second sensor, and the device comprises a first sensor or a user interface. In some examples, the welding system further comprises control circuitry configured to determine a remaining amount of wire on the wire spool based on the first parameter and second parameter, and generate an output based on the remaining amount of wire. In some examples, the first sensor comprises a proximity sensor and the second sensor comprises a weight sensor, a position sensor, or a distance sensor.

Some examples of the present disclosure relate to a method, comprising detecting a parameter of a wire spool retained on a spindle of a wire feeder via a sensor, the parameter comprising a weight of the wire spool, a radius of a wire retained on the wire spool, or a distance from the second sensor to the wire retained on the wire spool. In some examples, the method further comprises determining, via control circuitry, a remaining amount of wire on the wire spool based on the parameter; and generating an output based on the remaining amount of wire. In some examples, the parameter comprises a second parameter and the sensor comprises a second sensor, where the method further comprises detecting a first parameter of the wire spool via a device, the first parameter comprising a size of the wire spool, and the device comprising a first sensor or a user interface.

In some examples, the method further comprises determining, via control circuitry, a remaining amount of wire on the wire spool based on the first parameter and second parameter; and generating an output based on the remaining amount of wire. In some examples, the output comprises a graphic, video, audio, text, number, or percentage representative of the remaining amount of wire. In some examples, the output is delivered via a first user interface of the wire feeder, a second user interface of a welding-type power supply in communication with the wire feeder, or a third user interface of a remote device in communication with the wire feeder or the welding-type power supply.

In some examples, the output comprises a first output, and the method further comprises determining whether the remaining amount of wire is below a threshold; and generating a second output in response to determining the remaining amount of wire is below the threshold. In some examples, the second output comprises a link to a website or service where more wire can be ordered, an automatic reordering of wire, or a disabling of the wire feeder or a welding-type power supply. In some examples, the output comprises a first output, and the method further comprises determining a remaining amount of time before the remaining amount of wire is below the threshold based on the remaining amount of wire and a wire feed speed of the wire feeder; and generating a second output based on the remaining amount of time. In some examples, the device comprises the first sensor, the first sensor is retained on an inside wall of the wire feeder, and the spindle is retained on the inside wall, or an opposite inside wall, of the wire feeder.

FIG. 1 shows an example of a welding-type system 100, such as may be used to conduct welding-type operations (e.g., welding, cutting, brazing, etc.). In some examples, the example welding-type system 100 shown in FIG. 1 may be used to conduct gas metal arc welding (GMAW) processes. In some examples, the welding-type system 100 may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes). In some examples, the welding-type system 100 may be used with metal fabrication systems, such as plasma cutting systems, induction heating systems, and so forth.

In the example of FIG. 1, the welding-type system 100 includes a welding-type power supply 102 (a.k.a., a welding-type power source), a wire feeder 200, a gas tank 106, and a welding torch 108. As shown, the welding-type power supply 102 receives input power from a primary power source 101 (e.g., a mains power outlet). In some examples, the welding-type power supply 102 converts the input power to welding-type power that is used by various welding-type components and/or accessories of the welding-type system 100 (e.g., the wire feeder 200 and/or welding torch 108). In some examples, the welding-type power supply 102 may also convert the input power to auxiliary power, which may be used, for example, to power the components of the welding-type power supply 102 and/or wire feeder 200, and/or external devices connected to the welding-type power supply 102 and/or wire feeder 200.

In the example of FIG. 1, the welding-type power supply 102 is coupled to a work clamp 116 through line 115. The work clamp 116 holds a workpiece 112 that may be worked upon during a welding-type operation. As shown, the welding-type power supply 102 is also coupled to the gas tank 106. In the example of FIG. 1, the welding-type power supply 102 is further coupled to the wire feeder 200 through cables 103 (including gas hose 105). The wire feeder 200 is in turn coupled to the welding torch 108 through a conduit 107.

In the example of FIG. 1, the welding-type system 100 further includes a remote device 199. In some examples, the remote device 199 may comprise a device configured to communicate, process, receive, and/or output information, such as, for example, one or more of a computer server, desktop computer, laptop computer, tablet computer, smartphone, smart watch (and/or other smart accessory), pendant, and/or the welding torch 108. In some examples, the welding-type power supply 102 and/or wire feeder 200 may send information to, and/or receive information from, the remote device 199. In some examples, the information may relate to the welding-type system 100 and/or welding-type operations.

In some examples, welding-type power from the welding-type power supply 102 and/or gas from the gas tank 106 may be delivered to the welding torch 108 through the conduit 107. In some examples, filler material (e.g., wire) from the wire feeder 200 may also be supplied to the welding torch 108 via conduit 107. While shown as separate from the welding-type power supply 102 in the example of FIG. 1, in some examples the wire feeder 200 may be part of the welding-type power supply 102. Likewise, in some examples, the welding-type power supply 102 may instead directly couple to the welding torch 108, such that power, filler material, and/or gas may be directly transmitted to the welding torch 108 from the power supply 102.

While a welding torch 108 is depicted in the example of FIG. 1, in some examples, the torch 108 may be some other welding-type tool. In operation, an operator may engage a trigger of the torch 108 to initiate an arc (and/or other welding-type operation) between the torch 108 and the workpiece 112. In some examples, the arc may be formed between the workpiece 112 and filler material supplied to the torch 108 from the wire feeder 200. In some examples, the filler material may be melted by the arc and/or used to "fill" a weld created by the arc during a welding operation. Because the filler material is continuously consumed during the welding operation, the wire feeder 200 must constantly supply new filler material to the welding torch 108 in order for the welding operation to continue. Thus, it can be important for an operator to ensure an adequate supply of filler material is available.

Figure 2:
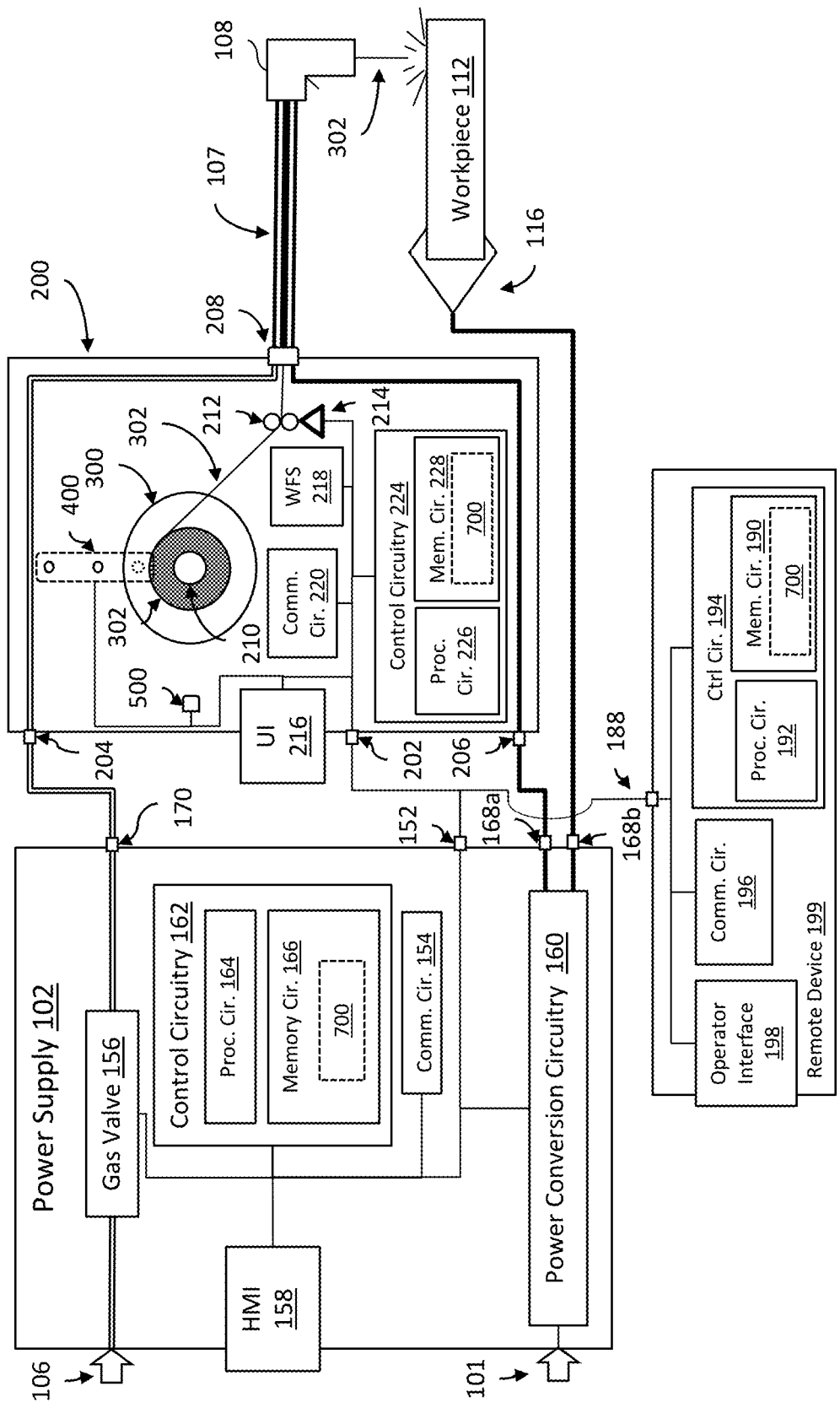
FIG. 2 is a block diagram showing components of the welding-type system of FIG. 1, in accordance with aspects of this disclosure.

FIG. 2 is a block diagram showing components of the welding-type system 100. As shown, the remote device 199 includes an operator interface (OI) 198, device communication circuitry 196, and device control circuitry 194. The OI 198, device communication circuitry 196, and device control circuitry 194 are interlinked through a common electrical bus. Though not shown in the example of FIG. 2, in some examples, the remote device 199 may also include one or more power sources (e.g., batteries, power circuitry, etc.).

In some examples, the OI 198 may comprise user accessible inputs and/or outputs. For example, the OI 198 may comprise one or more visual outputs (e.g., touch display screens, video monitors, light emitting diodes, incandescent lights, and/or other lights, etc.) and/or one or more audio outputs (e.g., audio speakers). In some examples, the OI 198 may further comprise one or more inputs (e.g., touch display screens, buttons, knobs, switches, microphones, etc.). In some examples, the OI 198 may comprise one or more input and/or output ports and/or devices (e.g., universal serial bus (USB) ports, audio ports, HDMI ports, disc drives, compact disc (CD) drives, digital video disc (DVD) drives, etc.). In some examples where the remote device 199 is a computer server, the OI 198 may be a different remote device 199.

In the example of FIG. 2, the device control circuitry 194 includes device processing circuitry 192 and device memory circuitry 190. In some examples, the device processing circuitry 192 may include one or more processors. In some examples, the device memory circuitry 190 may store machine readable instructions configured for execution by the device processing circuitry 192 and/or one or more processors. As shown, the device memory circuitry 190 includes a spool detection process 700, discussed further below. In some examples, the device control circuitry 194 may be configured to process inputs from the OI 198 and/or device communication circuitry 196, and/or control operation of the OI 198 and/or device communication circuitry 196.

In the example of FIG. 2, the remote device 199 further includes a device communication terminal 188 interlinked with the other components of the remote device 199 via the electrical bus. In some examples, the device communication circuitry 196 may be configured to facilitate communication (e.g., through the device communication terminal 188) via one or more wired protocols and/or wireless protocols. Wired protocols may include, for example, USB, Ethernet, serial, and/or other appropriate wired protocols. Wireless protocols may include, for example, cellular protocols, IEEE 802.11 standard protocols (commonly referred to as WiFi), short wavelength ultra-high frequency protocols (commonly referred to as Bluetooth), IEEE 802.15.4 standard protocols (commonly referred to as Zigbee), NFC protocols, RFID protocols, and/or other appropriate wireless protocols. In some examples, the device control circuitry 194 may include one or more driving circuits (and/or processes) for the device communication circuitry 196 and/or OI 198.

In the example of FIG. 2, the device communication terminal 188 is electrically connected to a power communication terminal 152 of the power supply 102 and a feeder communication terminal 202 of the wire feeder 200. While a wired connection is shown in the example of FIG. 2, in some examples, the connection may be via a wireless connection. In such an example, the device communication terminal 188, power communication terminal 152, and/or feeder communication terminal 202 may include one or more antennas to facilitate the wireless communication.

In the example of FIG. 2, the power supply 102 includes the power communication terminal 152, power communication circuitry 154, a gas valve 156, a human machine interface (HMI) 158, power conversion circuitry 160, and power control circuitry 162 interlinked through a common electrical bus. In some examples, the power communication circuitry 154 may be configured to facilitate communication (e.g., through the power communication terminal 152) via one or more wired protocols and/or wireless protocols, similar to what is described above with respect to the device communication circuitry 196. In some examples, the HMI 158 may comprise user accessible inputs and/or outputs similar to what is described above with respect to the OI 198.

In the example of FIG. 2, the power control circuitry 162 includes power processing circuitry 164 and power memory circuitry 166. In some examples, the power processing circuitry 164 may include one or more processors. In some examples, the power memory circuitry 166 may store machine readable instructions configured for execution by the power processing circuitry 164 and/or one or more processors. As shown, the power memory circuitry 166 includes a spool detection process 700, discussed further below. In some examples, the power control circuitry 162 may be configured to process inputs from the HMI 158 and/or power communication circuitry 154, and/or control operation of the HMI 158, power communication circuitry 154, gas valve 156, and/or power conversion circuitry 160.

In the example of FIG. 2, the power conversion circuitry 160 receives input power from a primary power source 101 (represented in FIG. 2 by arrow 101). In some examples, the power conversion circuitry 160 may be configured to convert the input power to welding-type power (and/or auxiliary power). In some examples, the power conversion circuitry 160 may include one or more rectifier circuits, pre-regulator circuits, and/or inverter circuits to conduct the conversion. In some examples, the power conversion circuitry 160 may include one or more transformers, inductors, capacitors, resistors, diodes, and/or other circuit components to conduct the conversion. In some examples, the power conversion circuitry 160 may include one or more controllable circuit elements, such as, for example, transistors, switches, and/or relays. In some examples, the power control circuitry 162 may be configured to control the conversion process of the power conversion circuitry by controlling one or more of the controllable circuit elements via one or more control signals. In the example of FIG. 2, the power conversion circuitry 160 outputs welding-type power to clamp 116 via power output terminal 168a, and outputs welding-type power to the wire feeder 200 via power output terminal 168b.

In the example of FIG. 2, the gas valve 156 is in fluid communication with the gas tank 106 (represented in FIG.

2 by arrow 106). In some examples, the power supply 102 controls a flow of gas from the gas tank 106 via the gas valve 156. In some examples, the power control circuitry 162 may control operation of the gas valve 156 via one or more signals. As shown, a gas output terminal 170 is in fluid communication with the gas valve 156.

In the example of FIG. 2, the power supply 102 is coupled to the wire feeder 200 via a fluid connection between the gas output terminal 170 of the power supply 102 and a gas input terminal 204 of the wire feeder 200. As shown, there is also an electrical connection between the power communication terminal 152 of the power supply 102 and the feeder communication terminal 202 of the wire feeder 200, as well as between the power output terminal 168a of the power supply 102 and a power input terminal 206 of the wire feeder 200. As shown, the wire feeder 200 further includes a torch outlet 208 coupled to the gas input terminal 204 and power input terminal 206. The torch outlet 208 connects to the conduit 107, which routes the gas, welding-type power, and filler material 302 to the welding torch 108.

In the example of FIG. 2, the wire feeder 200 further includes a spindle 210 configured to retain a spool 300 of filler material 302. Though shown in the example of FIG. 2 for the sake of clarity, in some examples, the filler material 302 may be hidden when viewed from the side, due to the outer flanges 304 of the spool 300, such as shown, for example, in FIGS. 4a-4b. As shown, the wire feeder 200 also includes feeder rolls 212 configured to route filler material 302 from the spool 300 to the torch outlet 208, and then to the welding torch 108 via the conduit 107.

In the example of FIG. 2, the wire feeder 200 also includes a feeder motor 214 configured to actuate (e.g., turn) one or more of the feeder rolls 212, to induce feeding of the filler material 302 via the feeder rolls 212. As shown, the wire feeder 200 further includes a user interface (UI) 216, feeder communication circuitry 220, feeder control circuitry 224, and a wire feed speed (WFS) sensor 218. In the example of FIG. 2, the motor 214, feeder communication terminal 202, UI 216, WFS sensor 218, feeder communication circuitry 220, and feeder control circuitry 224 are interconnected through a common electrical bus. In some examples, the WFS sensor 218 is configured to measure the speed at which the feeder rolls 212 rotate and/or the speed at which the motor 214 rotates the feeder rolls 212. In some examples, the WFS sensor 218 may be coupled to the feeder rolls 212 in order to make this measurement.

In the example of FIG. 2, the feeder control circuitry 224 includes feeder processing circuitry 226 and feeder memory circuitry 228. In some examples, the feeder processing circuitry 226 may include one or more processors. In some examples, the feeder memory circuitry 228 may store machine readable instructions configured for execution by the feeder processing circuitry 226 and/or one or more processors. As shown, the feeder memory circuitry 228 includes a spool detection process 700, discussed further below.

In some examples, the feeder control circuitry 224 may be configured to process inputs from the UI 216, feeder communication circuitry 220, and/or WFS sensor 218. In some examples, the feeder control circuitry 224 may be configured to control operation of the WFS sensor 218, motor 214, UI 216, and/or feeder communication circuitry 220. In some examples, the feeder communication circuitry 220 may be configured to facilitate communication (e.g., through the feeder communication terminal 202) via one or more wired protocols and/or wireless protocols, similar to what is described above with respect to the device communication circuitry 196. In some examples, the UI 216 may comprise user accessible inputs and/or outputs similar to what is described above with respect to the OI 198.

Figure 3:
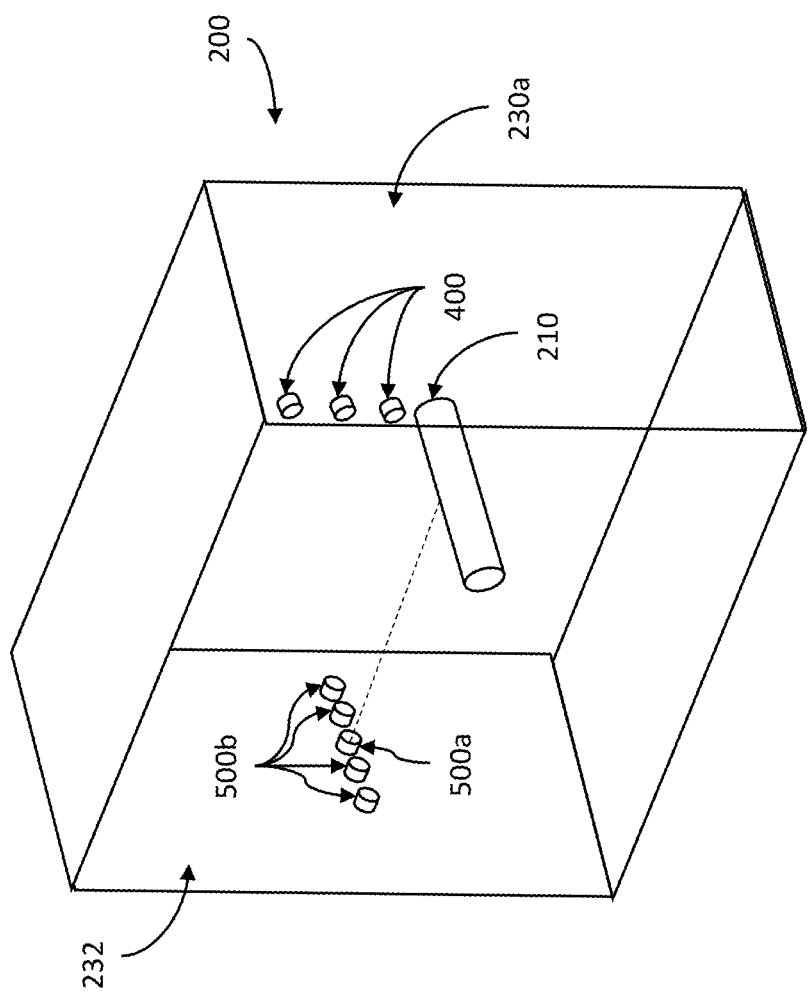
FIG. 3 is a perspective view of an interior of an example wire feeder of the welding-type system of FIG. 1, with certain components omitted for clarity, in accordance with aspects of this disclosure.

In the example of FIG. 2, the wire feeder 200 also includes one or more first sensors 400 and second sensors 500. In the example of FIG. 2, the first sensors 400 are vertically aligned with a center of the spindle 210 such that a straight vertical line could be drawn from each first sensor 400 to the center of the spindle 210. In some examples, the first sensors 400 may instead be aligned with a right side of the spindle 210, a left side of the spindle 210, and/or slightly misaligned. While three first sensors 400 are shown in the examples of FIGS. 2-3, in some examples, more or fewer first sensors 400 may be used (see, e.g., FIGS. 4a-4b). In some examples, one or more of the first sensors 400 may comprise proximity sensors, distance sensors, and/or presence detection sensors (e.g., a light curtain). In some examples, one or more of the first sensors 400 may comprise ultrasonic, inductive, capacitive, and/or photoelectric sensors. In some examples, the welding-type system 100 may be able to determine (and/or estimate) a size of the wire spool 300 based on which and/or how many first sensors 400 detect the presence and/or close proximity of the spool 300.

In the example of FIG. 2, the second sensor 500 is horizontally aligned with the center of the spindle 210, such that a straight horizontal line could be drawn from the second sensor(s) 500 to the center of the spindle 210. In some examples, the second sensor(s) 500 may instead be aligned with a top of the spindle 210, a bottom of the spindle 210, and/or slightly misaligned. While only one second sensor 500 is shown in the example of FIG. 2, due to the viewpoint, FIG. 3 shows multiple second sensors 500. In some examples, more or fewer second sensors may be used. In some examples, one or more of the second sensor(s) 500 may comprise one or more distance sensors, configured to measure a distance from the sensor to the filler material 302 on the spool 300. In some examples, one or more of the second sensor(s) 500 may comprise one or more weight sensors (e.g., strain gauge(s), load cell(s), and/or spring deflection sensor(s)) configured to detect a weight of the spool 300 retained by the spindle 210. Though not shown in the example of FIG. 2 for the sake of simplicity, in such an example, the second sensor(s) 500 may be integrated with and/or coupled to the spindle 210. In some examples, data from the second sensor(s) 500 may assist in determining the size of the spool 300, and/or how much filler material remains on the spool 300.

FIG. 3 shows a perspective view of the first sensors 400, second sensors 500, and spindle 210 within an interior of the example wire feeder 200. For the sake of clarity and simplicity, the other components are omitted. In order to depict the interior, one sidewall of the wire feeder 200 is removed and the front wall has been made transparent.

In the example of FIG. 3, the first sensors 400 are attached to a sidewall 230a of the wire feeder 200, and the second sensors 500 are attached to a rear wall 232 of the wire feeder. As shown, the spindle 210 is attached to the same sidewall 230a as the first sensors 400. At least one second sensor 500a is aligned with an approximate horizontal and vertical center of the spindle 210. In some examples, all the second sensors 500 may be aligned with an approximate vertical center of the spindle 210. As shown, other second sensors 500b are arrayed on either side of the centered second sensor 500a.

In some examples, one or more of the second sensors 500 may be distance sensors. In such an example, multiple second sensors 500 may allow for multiple distance measurements to be made. These measurements may be helpful, for example, in situations where the filler material 302 is not centered on the spool 300, the spool 300 is not centered on the spindle 210, or there is significant difference between the radius of the filler material 302 at different places on the spool 300. In some examples, the mean or medium of the measurements may be used, and/or the measurement(s) determined most likely to be accurate (e.g., within some expected threshold range) may be used. In some examples, the second sensors 500 may also be used to detect outer flanges 304 of the spool 300, so as to help determine the size (e.g., width) of the spool 300. While five second sensors 500 are shown in the example of FIG. 3, in some examples, more or less second sensors 500 may be used.

FIGS. 4a-4b show front views of an interior of the example wire feeder 200. As shown, the wire feeder 200 has a spool 300 of filler material 302 retained on the spindle 210, and the first sensors 400 retained on sidewalls 230. For the sake of clarity and simplicity, other components are omitted, and the front wall has been made transparent. As shown, the spool 300 is retained on the spindle 210 that is attached to the sidewall 230a. In some examples, the spindle 210 may be attached to the opposite sidewall 230b. As shown, first sensors 400 are attached to the sidewall 230a, aligned with the spindle 210. Complementary first sensors 400 are attached to the opposite sidewall 230b. As shown, the two sets of first sensors 400 are aligned with one another.

In some examples, aligned first sensors 400 on the sidewalls 230 may be paired as opto-electrical transmitters and receivers. In this way, a presence detecting sensor system (e.g., a light curtain) may be implemented. In such an example, each first sensor 400 (and/or pair of first sensors 400) may output one or more signals representative of whether the spool 300 is detected. For example, each first sensor 400 that is a receiver may output a signal indicating whether it has received light from its paired transmitter first sensor 400. In some examples, the complementary set of first sensors 400 on sidewall 230b may be omitted, and/or the first sensors 400 may be proximity sensors and/or distance sensors. In such an example, each first sensor 400 may output a signal representative of whether the spool 300 is detected in proximity and/or within a certain threshold distance.

Depending on the size of the spool 300, the flanges 304 may block the light from some first sensors 400, or be detected in close proximity by some first sensors 400, and not others, thereby giving an indication of the size (e.g., radius) of the spool 300. Importantly, the size/radius of the flanges 304 of the spool 300 remain constant, even as the filler material 302 retained on the spool 300 is used. Additionally, in some examples, the welding-type system 100 may know (e.g., store in memory) the placement of the first sensors 400, such as, for example how far each first sensor 400 is from the spindle 210 and/or from each other. Thus, the system 100 may be able to determine the likely size (e.g., radius) of the spool 300, given which first sensors 400 detect the spool 300, and which do not.

In the example of FIG. 4a, an optical path between all three pairs of first sensors 400 is interrupted by the spool 300. Thus, the system 100 may determine that the radius of the flange 304 of the spool 300 is at least equal to the distance from the spindle 210 to the upper most first sensor 400. On the other hand, in the example of FIG. 4b, the optical path between only two pairs of first sensors 400 are interrupted by the spool 300. Thus, the system 100 may determine that the radius of the spool 300 is at least equal to the distance from the spindle 210 to the middle first sensor 400, and less than the distance from the spindle 210 to the upper most first sensor 400. In some examples, the first sensors 400 may be placed at increments sufficient to ensure that at least one first sensor 400 will change state (e.g., from detecting the spool 300 to not detecting, or vice versa) if the size of a spool 300 is changed. In some examples, the welding-type system 100 may store (e.g., in memory) a data structure that maps a size (and/or height, radius, etc.) of a spool 300 to other information about the spool 300 (e.g., amount or size of the filler material 302 on the spool 300 when the spool 300 is full, size of core of spool 300, width of spool 300, etc.).

Figure 5B:
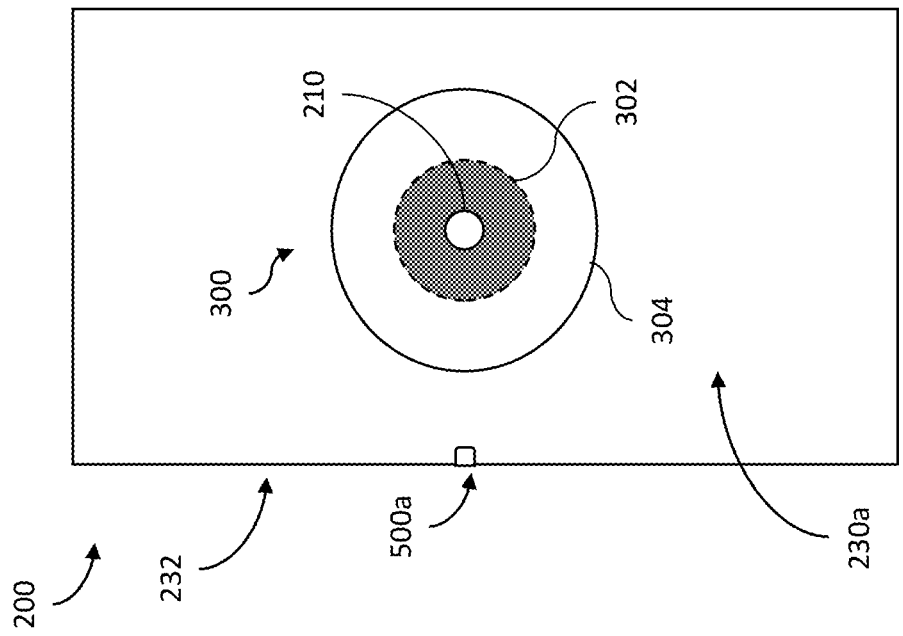
FIGS. 5a-5b are side views of the wire feeder of FIG. 4a, with certain components omitted for clarity, in accordance with aspects of this disclosure.
Figure 5A:
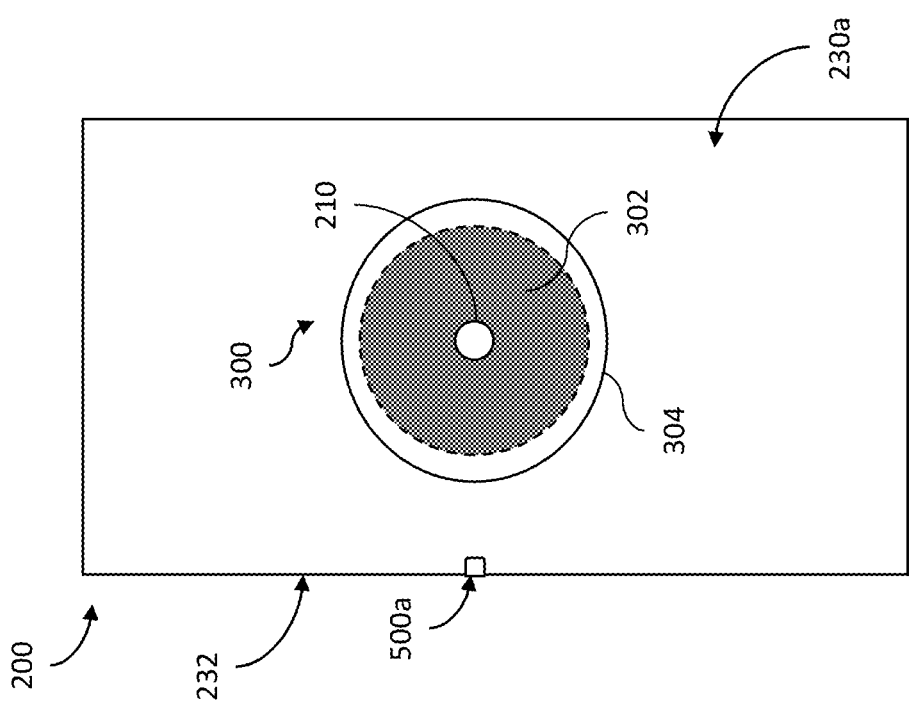

FIGS. 5a-5b illustrate how the distance from the second sensor(s) 500 may vary depending on how much filler material 302 is retained on the spool 300. FIGS. 5a-5b show side views of an interior of the example wire feeder 200. As shown, the wire feeder 200 has a spool 300 of filler material 302 retained on the spindle 210, and second sensor 500b retained on the back wall 232. For the sake of clarity and simplicity, other components are omitted, and the sidewall 230b has been made transparent.

In the example of FIG. 5a, the spool 300 is nearly full with filler material 302. In the example of FIG. 5b, much of the filler material 302 on the spool 300 has been consumed by the welding operation. As shown, the distance from the second sensor 500a to the filler material is less in FIG. 5a than in FIG. 5b. Given a known (e.g., stored in memory) distance from the second sensor 500a to the spindle 210, and a measured distance from the second sensor 500a to the filler material 302, a radius of the filler material 302 that is coiled on the spool 300 may be determined. Given a width of the spool 300 and a radius of the filler material 302, an amount of filler material 302 on the spool 300 may be determined. Given a known (e.g., stored in memory) radius and/or amount of filler material 302 on the spool 300 when the spool 300 is full, the system 100 may determine what portion/percentage of filler material 302 remains. Further given a wire feed speed (e.g., measured by the WFS sensor 218) a remaining amount of time before a threshold amount/portion/percentage of filler material 302 is reached may be determined. In some examples, an average amount of filler material 302 used recently (e.g., stored in memory) and/or an average amount of filler material 302 used by a given welding-type operation (e.g., stored in memory) may be used to determine remaining time instead of a measured wire feed speed.

Figure 6A:
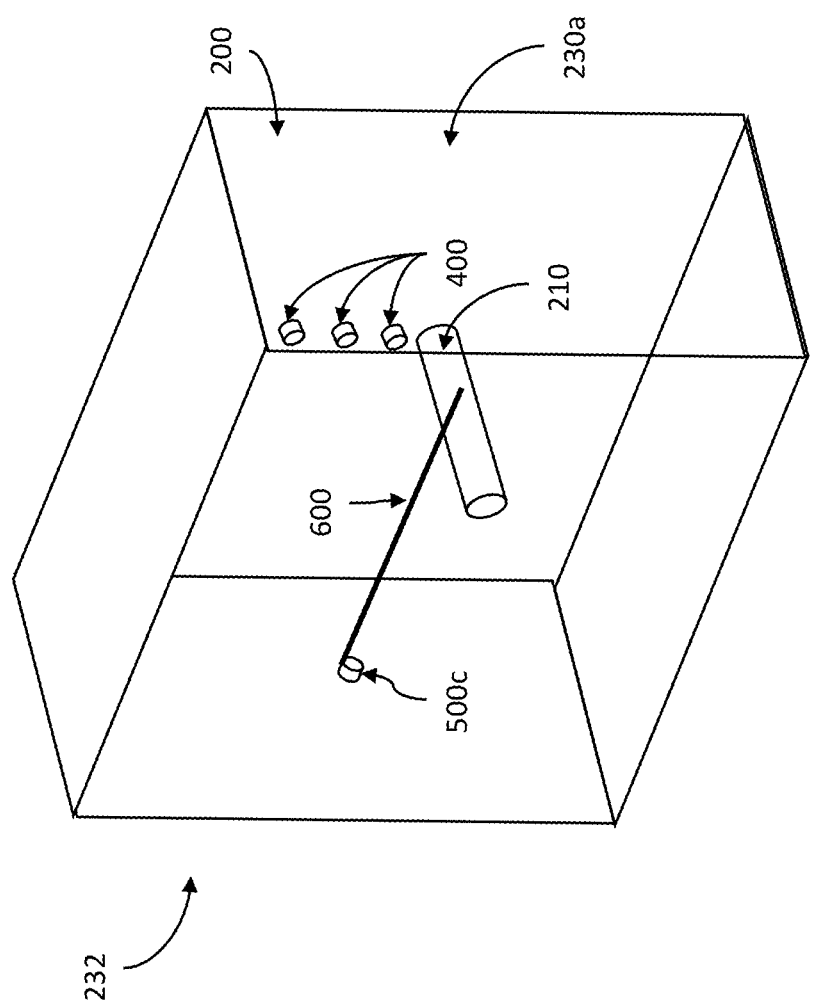
FIG. 6a is a perspective view of an alternative example wire feeder, with certain components omitted for clarity, in accordance with aspects of this disclosure.
Figure 6C:
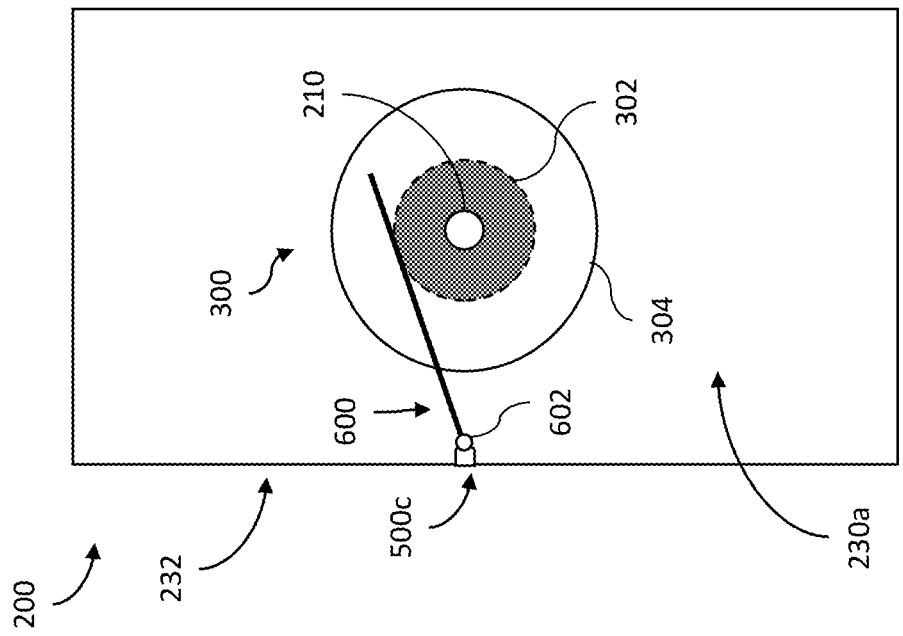
FIGS. 6b-6c are side views of a spool retained within the alternative example wire feeder of FIG. 4a with certain components omitted for clarity, in accordance with aspects of this disclosure.
Figure 6B:
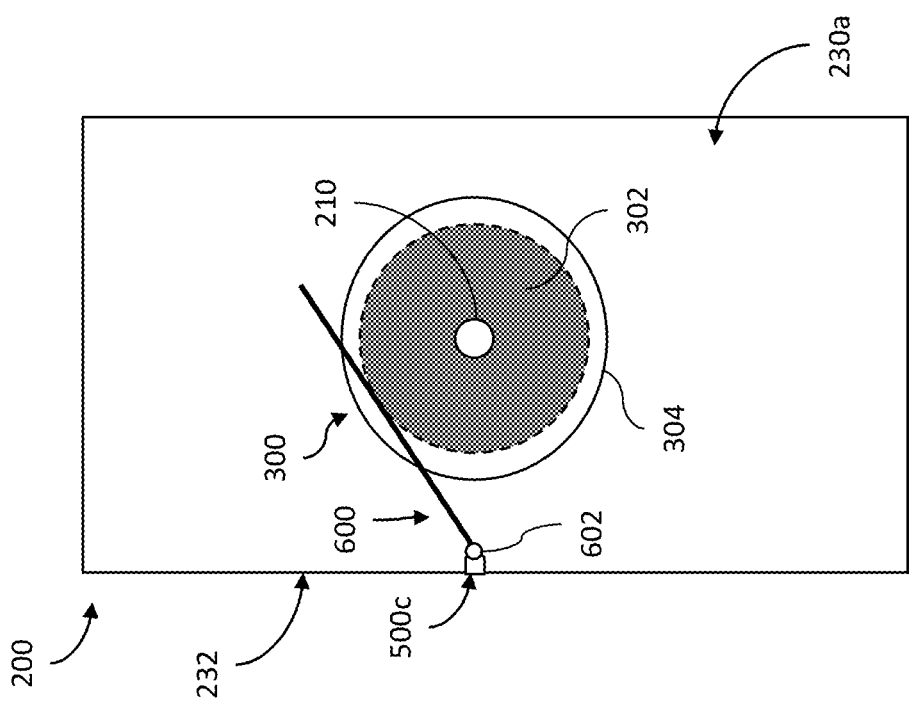

FIGS. 6a-6c show an alternative example of a second sensor 500c. While only one second sensor 500c is depicted, in some examples several second sensors 500c may be used. In some examples, the second sensor 500c may be used as the centered second sensor 500a. In some examples, the second sensor 500c may include a potentiometer. In some examples, the second sensor 500c may comprise a position and/or angle sensor.

As shown, the second sensor 500c uses a guide arm lever 600 to detect a remaining amount of filler material 302, rather than a measured distance. One end of the guide arm lever 600 rests on the filler material 302, while the other end is attached to a rotational shaft 602. In some examples, the rotational shaft 602 may be part of a potentiometer that changes its resistance depending upon the rotational angle of the shaft 602.

In some examples, the second sensor 500c may include a circuit having the potentiometer, and/or connect the potentiometer to a circuit. In some examples, the circuit may be configured to output a signal that varies as the resistance of the potentiometer changes. Thereby, the system 100 may evaluate and/or translate the output signal to determine the angle of the guide arm lever 600 and/or the radius of the filler material 302 (e.g., via a mapping and/or algorithm stored in memory). In some examples, the guide arm lever 600 may be weighted and/or otherwise biased downwards towards the spindle 210 to ensure the guide arm lever 600 moves towards the spindle 210 as the filler material 302 is consumed.

Figure 7:
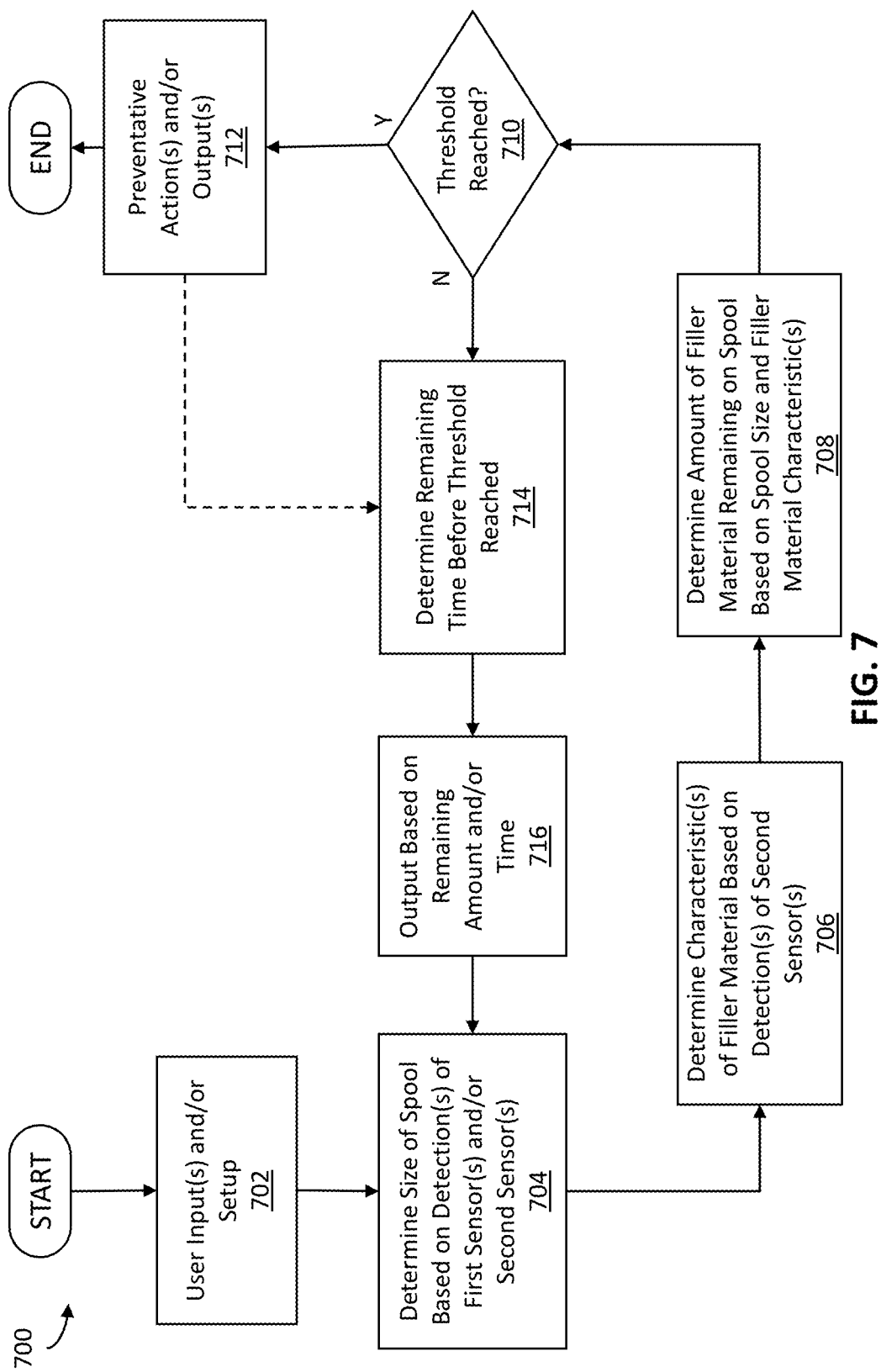
FIG. 7 is a flow diagram illustrating an example spool detection process, in accordance with aspects of this disclosure.

FIG. 7 is a flow diagram illustrating an example operation of the spool detection process 700. The spool detection process 700 is illustrated as stored in feeder memory circuitry 228, power memory circuitry 166, and device memory circuitry 190 in FIG. 2 to indicate that portions of the spool detection process 700 may be performed and/or executed by the wire feeder 200, power supply 102, and/or remote device 199. However, in some examples, the spool detection process 700 may be performed by only one of the wire feeder 200, power supply 102, and/or remote device 199.

In some examples, the spool detection process 700 may be implemented via machine readable instructions stored in feeder memory circuitry 228 and/or power memory circuitry 166. Though illustrated as being stored in memory, in some examples the spool detection process 700 may alternatively, or additionally, be implemented via discrete circuitry of the feeder control circuitry 224, device control circuitry 194, and/or power control circuitry 162. In some examples, the spool detection process 700 may be executed as part of, or in parallel with, a larger welding-type process.

In the example of FIG. 7, the spool detection process 700 begins at block 702. At block 702, a user provides one or more inputs and/or performs one or more setup operations. In some examples, the input(s) may be provided via the UI 216 of the wire feeder 200, the HMI 158 of the power supply 102, and/or the OI 198 of remote device 199. In some examples, the user input(s) may include, for example, a welding-type process, welding-type operation, material of workpiece 112, positioning of workpiece 112, tool type, gas type, spool size, spool brand, spool identifier, filler material type, filler material identifier, threshold information, and/or other relevant information. In some examples, the setup operations may include installation of a spool 300 on the spindle 210, initial routing of filler material 302 from the spool 300 to the feeder rolls 212, placement of the guide arm lever(s) 600, and/or indicating that a spool 300 has been installed.

In the example of FIG. 7, the spool detection process 700 proceeds to block 704 after block 702. At block 704, the spool detection process 700 determines the size of the spool 300 based on data from the first sensors 400 and/or second sensor(s) 500. In some examples, the size of the spool 300 may comprise a height and/or width of the spool 300. The "height" may be equal to the diameter of a flange 304 of the spool 300. The "width" may be equal to the distance between the flanges 304 of the spool 300.

In some examples, data from the first sensors 400 may be used to determine a height of the spool 300. For example, each first sensor 400 (or each pair of first sensors 400 where the first sensors 400 are paired) may output a signal representative of whether or not the first sensor 400 detects the presence, proximity, and/or close distance of a flange 304 of the spool 300. Importantly, the height of the flanges 304 of the spool 300 remains constant, even as the filler material 302 retained on the spool 300 is used. Thus, based on detection data from the first sensors 400 and stored data regarding first sensor 400 placements (and/or separation distances), the spool detection process 700 may determine and/or estimate a radius of the spool 300, from which the height (and/or diameter) may be determined.

In some examples, data from the first sensors 400 and/or second sensor(s) 500 may be used to determine a width of the spool 300. For example, a pair of first sensors 400 (e.g., the pair nearest the spindle 210) may detect a distance from each flange 304 to each first sensor 400 of the pair. Thereafter, the spool detection process 700 may determine the width of the spool 300 based on the detected distances and a known (and/or stored) distance between each pair of first sensors 400.

As another example, second sensors 500 may detect each flange 304 of the spool 300 and the spool detection process 700 may determine the width of the spool 300 based on the detections and a known (and/or stored) distance between each second sensor 500. In some examples, this may be done using either the distance second sensors 500 or the guide arm lever 600 second sensors 500. For example, where distance second sensors 500 are used, the spool detection process 700 may conclude a flange 304 is detected by the second sensors 500 with the closest distance measurements (since the radius of the filler material 302 is likely to be less than the radius of the flange 304). Where the guide arm lever 600 is used, the spool detection process 700 may conclude a flange 304 is detected at the second sensors 500 with the largest angle measurements.

In the example of FIG. 7, the spool detection process 700 proceeds to block 706 after block 704. At block 706, the spool detection process 700 determines one or more characteristics of the filler material remaining on the spool 300. For example, the second sensor(s) 500 may output one or more signals signal representative of a weight of the spool 300 that retains the filler material 302. As another example, the second sensor(s) 500 may output one or more signals representative of a distance from the second sensor(s) 500 to the filler material 302. As another example, the second sensor(s) 500 may output one or more signals representative of an angle of a guide arm lever 600 resting on the filler material 302.

In the example of FIG. 7, the spool detection process 700 proceeds to block 708 after block 706. At block 708, the spool detection process 700 determines an amount of filler material remaining on the spool 300. In some examples, this determination may be based on the size of the spool 300 determined at block 704 and/or the one or more characteristics of the filler material 302 determined at block 706.

In some examples, the signal(s) from the second sensor(s) 500 regarding the characteristic(s) of the filler material 302 may be evaluated by the spool detection process 700 to determine an amount of filler material 302 remaining on the spool 300. For example, the spool detection process 700 may translate a weight detected by the second sensor(s) 500 to a value (e.g., length, radius, diameter, percentage, etc.) of remaining filler material 302. As another example, the spool detection process 700 may translate a distance detected by the second sensor(s) 500 to a value of remaining filler material 302. In such an example, the spool detection process 700 may use a known (e.g., stored) distance from the second sensor(s) 500 to the spindle 210 to perform the translation. As yet another example, the spool detection process 700 may translate the angle of the guide arm lever 600 to a value representative of the remaining amount of filler material 302 retained on the spool 300.

In some examples, the spool detection process 700 may use other known information about the spool 300 to translate the characteristic(s) of the filler material 302 into a value of filler material 302 remaining on the spool 300. For example, the spool detection process 700 may use a known weight of the spool 300 when full and/or empty to translate a detected weight of the spool to an amount of remaining filler material 302. As another example, the spool detection process 700 may use a known radius of filler material 302 when the spool 300 is full, a known width of a spool 300, and/or a known radius of a core of spool 300, to translate a detected distance to the filler material to an amount of remaining filler material 302. In some examples, this additional known information may be stored as part of a data structure that maps a size of a spool 300 (e.g., height and/or width) to other known information about the spool 300. In some examples, the stored mapping may be based on additional data besides the size of the spool 300 as well (e.g., type of filler material 302, brand of spool 300, etc.). In some examples, some or all of the additional data (e.g., core radius, width of the spool 300, etc.) may be sufficiently trivial and/or consistent between different spools 300 to disregard and/or use default values.

In the example of FIG. 7, the spool detection process 700 proceeds to block 710 after block 708. At block 710, the spool detection process 700 determines whether a threshold amount of remaining filler material 302 has been reached. In some examples, the threshold may be predetermined and/or stored. In some examples, the threshold may be user entered (e.g., at block 702).

In the example of FIG. 7, the spool detection process 700 proceeds to block 712 after block 710 if the spool detection process 700 determines that the threshold has been reached. At block 712, the spool detection process 700 takes one or more preventative actions and/or generates one or more outputs to prevent a lack of filler material 302 from negatively impacting the welding-type operation. For example, the spool detection process 700 may shut down and/or disable the welding-type power supply 102. As another example, the spool detection process 700 may output a prominent and/or emphasized alert, notification, and/or warning (e.g., via the UI 216, HMI 158, and/or OI 198). In some examples, the alert, notification, and/or warning may be output via a communication (e.g., via email, text message, and/or or app) to an operator, owner, purchasing manager, and/or welding supply distributor. As another example, the spool detection process 700 may open a website or service where more filler material 302 can be ordered, output a link to a website or service where more filler material 302 can be ordered, and/or automatically reorder more filler material 302.

In the example of FIG. 7, the spool detection process 700 ends after block 712. However, as shown, in some examples, the spool detection process 700 may proceed to block 714 after 712 instead of ending. As shown, the spool detection process 700 also proceeds to block 714 after block 710 if the spool detection process 700 determines that a threshold amount of remaining filler material 302 has not been reached.

At block 714, the spool detection process 700 determines a remaining time until the threshold amount of filler material 302 is reached. In some examples, the spool detection process 700 may base this determination on the amount of remaining filler material 302 and a current, previous, and/or average wire feed speed (e.g., as detected by the WFS sensor 218). In some examples, the spool detection process 700 may base the determination on the amount of remaining filler material and a typical wire feed speed and/or usage rate of filler material 302 associated with the current welding-type process and/or welding-type operation. In some examples, the remaining time may be a positive or negative value (e.g., to account for situations where the threshold has been surpassed). In examples where block 714 executes after block 712, and the threshold amount of remaining filler material 302 used at block 710 is greater than zero, the spool detection process 700 may use zero as the threshold.

In the example of FIG. 7, the spool detection process 700 proceeds to block 716 after block 714. At block 716, the spool detection process 700 provides an output based on the remaining amount of filler material 302 and/or the remaining time determined at blocks 708 and 714. In some examples, the output may be representative of the remaining amount of filler material 302 and/or the remaining time. In some examples, the remaining amount of filler material 302 may be representative of the remaining amount in relation to a full or beginning amount. In some examples, the remaining amount of filler material 302 may be output in terms of length, weight, radius, and/or diameter. In some examples, the remaining amount of filler material 302 may be output in the form of a graphic, video, audio, text, numeric, and/or percentage (e.g., of total possible and/or beginning amount of filler material 302). In some examples, the output may be a communication (e.g., via email, text message, and/or app) to an operator, owner, purchasing manager, and/or welding supply distributor. As shown, the spool detection process 700 returns to block 704 after block 716, and the spool detection process 700 repeats.

The disclosed wire feeder 200 and smart spool detection process 700 can automatically detect and/or determine the remaining amount of filler material 302 on a spool 300, as well as how long until the filler material 302 is consumed. With this information, an operator need not open the wire feeder 200 and/or remove the spool 300 to manually check how much filler material 302 remains. The smart spool detection process 700 may also automatically order more consumable filler material 302 if needed, and/or stop the welding-type operation if the remaining filler material 302 hits a threshold, so as to prevent negative impact on the welding operation.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "approximate" and/or "approximately," when used to modify or describe a value (or range of values), position, shape, orientation, and/or action, mean reasonably close to that value, range of values, position, shape, orientation, and/or action. Thus, the examples described herein are not limited to only the recited values, ranges of values, positions, shapes, orientations, and/or actions but rather should include reasonably workable deviations.

As utilized herein, the terms "e.g.," and "for example" set off lists of one or more non-limiting examples, instances, or illustrations.

As used herein, the terms "couple," "coupled," "attach," "attached," "connect," and/or "connected" refer to a structural and/or electrical affixing, joining, fasten, linking, and/or other securing.

As utilized herein the terms "circuits" and "circuitry" refer to physical electronic components (i.e. hardware) and/or any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "configured" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a welding-type tool refers to any tool capable of performing a welding, cladding, brazing, plasma cutting, induction heating, carbon arc cutting or gouging and/or resistive preheating operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

While the present method and/or system has been described with reference to certain implementations, it will be understood by those skilled in the art that various changes may be made and equivalents may be substituted without departing from the scope of the present method and/or system. For example, blocks and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
a wire feeder comprising:
a spindle configured to retain a wire spool comprising a first outer flange and a second outer flange, wherein a wire is retained on the wire spool between the first outer flange and the second outer flange,
a first sensor configured to detect a presence or proximity of the first outer flange of the wire spool, and
a second sensor configured to detect a radius of the wire retained on the wire spool or a distance from the second sensor to the wire retained on the wire spool; and
control circuitry configured to:
determine a spool size of the wire spool based on whether the presence or proximity of the first outer flange of the wire spool is detected by the first sensor, determine a remaining amount of wire on the wire spool based on the spool size and the radius of the wire retained on the wire spool or the distance from the second sensor to the wire retained on the wire spool detected by the second sensor, and generate an output based on the remaining amount of wire.

2. The welding system of claim 1, wherein the wire feeder further comprises a plurality of first sensors comprising the first sensor, each first sensor of the plurality of first sensors configured to detect the presence or proximity of the first outer flange of the wire spool, the control circuitry being configured to determine
   (i) the spool size of the wire spool based on whether the presence or proximity of the first outer flange of the wire spool is detected by each first sensor of the plurality of first sensors, or
   (ii) the remaining amount of wire based on (a) the radius of the wire retained on the wire spool, or the distance from the second sensor to the wire retained on the wire spool, detected by the second sensor and (b) the presence or proximity of the first outer flange of the wire spool detected by each first sensor of the plurality of first sensors.

3. The welding system of claim 1, wherein the control circuitry is configured to determine (i) a core size of a core of the wire spool based on whether the presence or proximity of the first outer flange of the wire spool is detected by the first sensor, and (ii) the remaining amount of wire based on the core size of the core of the wire spool and the radius of the wire retained on the wire spool, or the distance from the second sensor to the wire retained on the wire spool, detected by the second sensor.

4. The welding system of claim 3, further comprising memory circuitry storing a mapping between the core size of the core of the wire spool and a flange size of the first outer flange or the second outer flange of the wire spool, wherein the control circuitry is further configured to:
   determine the flange size of the first outer flange or the second outer flange of the wire spool based on whether the presence or proximity of the first outer flange of the wire spool is detected by the first sensor, and
   determine the core size of the core of the wire spool based on (i) the flange size of the first outer flange or the second outer flange of the wire spool, and (ii) the mapping between the flange size and the core size.

5. The welding system of claim 1, wherein the output comprises a first output, and wherein the control circuitry is further configured to:
   determine whether the remaining amount of wire is below a threshold, and
   generate a second output in response to determining the remaining amount of wire is below the threshold,
   wherein the second output comprises a link to a website or service where more wire can be ordered, an automatic reordering of wire, or a disabling of the wire feeder or a welding-type power supply.

6. The welding system of claim 1, wherein the wire feeder further comprises:
   a first housing wall, the spindle being connected to the first housing wall, and
   a second housing wall connected to the first housing wall, wherein the first sensor is also connected to the first housing wall, or the second sensor is connected to the second housing wall.

7. A welding system, comprising:
   a wire feeder comprising:
      a spindle configured to retain a wire spool, the wire spool comprising a first outer flange connected to a second outer flange by a core, wherein a wire is retained on the core between the first outer flange and the second outer flange,
      a spool size sensor configured to detect a presence or proximity of the first outer flange or the second outer flange of the wire spool, and
      a wire size sensor configured to detect a radius of the wire retained on the wire spool or a distance from the wire size sensor to the wire retained on the wire spool; and
   control circuitry configured to:
      determine a distance between the first outer flange and the second outer flange of the wire spool based on whether the presence or proximity of the first outer flange or the second outer flange of the wire spool is detected by the spool size sensor,
      determine a spool size of the wire spool based on the distance between the first outer flange and the second outer flange of the wire spool,
      determine a remaining amount of wire on the wire spool based on (i) the radius of the wire retained on the wire spool, or the distance from the wire size sensor to the wire retained on the wire spool, detected by the wire size sensor and (ii) the spool size of the wire spool, and
      generate an output based on the remaining amount of wire.

8. The welding system of claim 7, wherein the wire feeder further comprises a plurality of spool size sensors comprising the spool size sensor, each spool size sensor of the plurality of spool size sensors configured to detect the presence or proximity of the first outer flange or the second outer flange of the wire spool, the control circuitry being configured to determine:
   the distance between the first outer flange and the second outer flange of the wire spool based on whether the presence or proximity of the first outer flange or the second outer flange of the wire spool is detected by each spool size sensor of the plurality of spool size sensors.

* * * * *